Nov. 9, 1948.    G. BENNETT    2,453,112
CLAMP
Filed Feb. 14, 1946
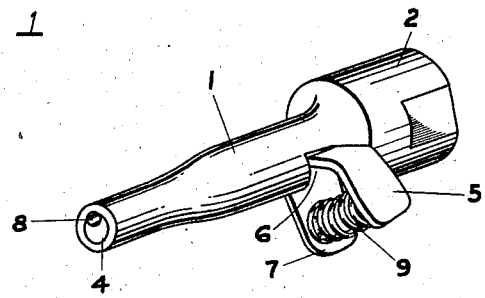
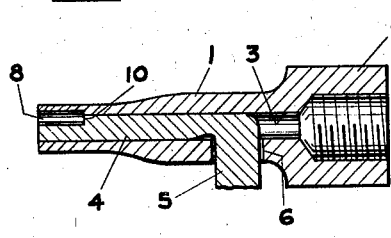
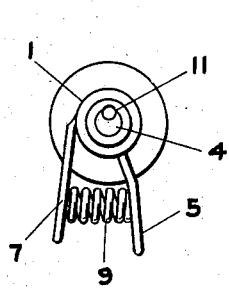
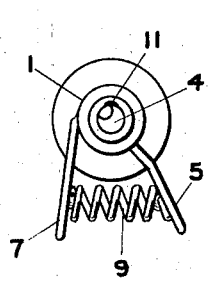
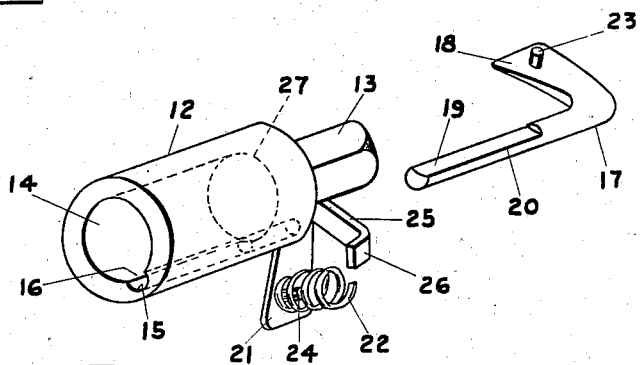
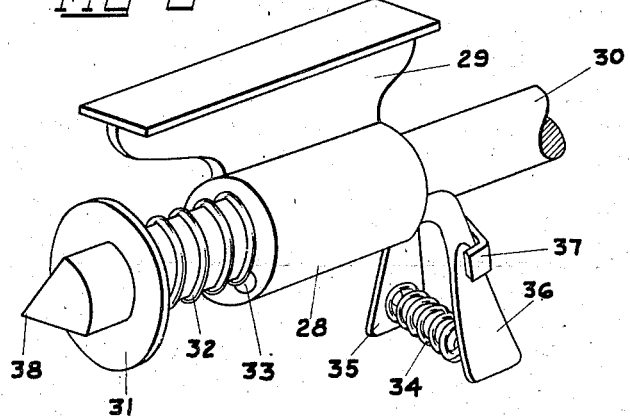
INVENTOR.
GEORGE BENNETT
BY M. O. Hayes
ATTORNEY Patented Nov. 9, 1948

2,453,112

UNITED STATES PATENT OFFICE 2,453,112

CLAMP

George Bennett, Vallejo, Calif.

Application February 14, 1946, Serial No. 647,644

7 Claims. (Cl. 279—97)

(Granted under the act of March 3, 1883, as amended April 30, 1928; 370 O. G. 757)

This invention relates to clamps and more particularly to clamps for gripping studs, rods and the like.

Objects of the invention are to provide a clamp which has a sure grip on cylindrical members and other rods, is easy to operate with the fingers of one hand, is readily and inexpensively made and is of simple, durable construction.

In accomplishing these and other objects of the present invention, I have provided improved details of structure, the preferred forms of which are illustrated in the accompanying drawings, wherein:

Fig. 1 is a perspective view of one embodiment of the invention applied to a chuck for holding small studs in a stud welding gun;

Fig. 2 is a longitudinal cross-section of the device of Fig. 1;

Fig. 3 is an end view of the device of Fig. 1 in the unlocked position without a stud therein;

Fig. 4 is an end view of the device in Fig. 1 in the locking position without a stud therein;

Fig. 5 is an exploded view of another modification of the invention applied to a chuck for holding large studs on stud welding guns; and Fig. 6 is a perspective view of another modification of the invention applied to a clamp for a rod.

Although the present invention is applicable to holding or clamping rods or tubes of many different shapes, sizes and lengths, it has been found particularly useful in holding studs in the chucks of stud welding guns.

Referring more particularly to the drawing, the modification shown in Figs. 1, 2, 3 and 4 illustrates the use of the invention in a chuck for a stud welding gun for holding small studs of generally cylindrical shape. Numeral 1 indicates the main body member of the chuck which may conveniently be made of metal in a generally cylindrical or conically tapered shape. On one end of the body member 1, is formed or attached a nut 2 threaded to engage the end of the plunger of a conventional stud welding gun. A cylindrical bore 3 is provided in the member 2 to receive a locking pin 4. The pin 4 is provided with an arm 5 which may conveniently be formed integral therewith by flattening the end thereof to a convenient size. The arm 5 extends outwardly from the pin 4 through a circumferentially extending slot 6 provided in the body member 1. In assembling the device, the pin 4, already bent to form the arm 5, may be inserted in the bore 3 and thereafter the nut 2 may be brazed into place to form one side wall of the slot 6. A second arm 7 is attached by welding or brazing to the body member and extends transversely therefrom. A cylindrical counterbore 8 of the proper size to receive a small welding stud is formed partially in the wall of the member 1 and preferably more extensively in the end of the pin 4. Two or more such counterbores may be formed in the chuck, if desired, to receive a plurality of studs or wires simultaneously. A coil spring 9 or the equivalent, is interposed between the two arms 5 and 7, tending to force them apart so as to rotate the pin 4 in its journal to a position wherein the complementary portions of the counterbore 8 are no longer opposite each other as shown in Fig. 4.

In operation the chuck is secured into place by means of the nut 2 onto the plunger of a stud welding gun. The arms 5 and 7 are squeezed together between the thumb and fingers until the complementary portions of the counterbore 8 are opposite each other as shown in Fig. 2 to form a complete circular cylindrical opening to receive the stud. The stud is then inserted until it reaches the bottom 10 of the bore 8 and the arms 5 and 7 are then released. The spring 9 forces the arms apart which rotates the pin 4 until the detent edge 11, formed by the intersection of the concavity in the member 4 and the external cylindrical surface thereof, bites into and firmly grips the stud.

Fig. 5 illustrates a second modification of the invention as applied to a chuck for a stud welding gun for use with relatively large studs. Numeral 12 indicates a body member which may conveniently be of generally cylindrical shape and which has attached to one end thereof a nut 13 for conveniently applying the chuck to a plunger of a stud welding gun. A bore 14 is provided in the member 12 of the proper size and depth to receive a known size of stud. In the wall of the member 12 a second cylindrical bore 15 is provided intersecting the cylindrical surface of the bore 14 and thus interrupting the surface of the bore 14 as shown at 16. A locking pin 17 is journalled in the bore 15. For illustrative purposes the pin in this exploded view is shown rotated approximately 90° from its normal range of positions. The pin 17 is provided with an arm 18 conveniently formed integral therewith for rotating the pin in its journal. The pin 17 is also provided with a concavity 19 of the same depth and curvature as the counterbore 14. The intersection of the surface of the concavity with the cylindrical surface of the pin 17 forms a detent edge as shown at 20 similar to the detent edge 11 shown in the device of Fig. 1. A reaction arm 21, similar to the arm 7 in Fig. 1, is welded or otherwise attached at the rear portion of the body member 12 and a coil spring 22, or the equivalent, is interposed between the two arms 18 and 21. The spring is retained by the pins 23 and 24 protruding from the arms 18 and 21 respectively. To limit the outward motion of the arm 18 when no stud is in the chuck, a stop means is provided in the form of a piece of flat stock 25 welded to the rear of the body member 12 and bent as at 26 to form a keeper engaging the arm 18.

In assembling the device the pin 17 is first inserted in the bore 15 and then the stop means 25 is welded in place preventing the pin 17 from thereafter accidentally falling out.

In operation the arms 18 and 21 are squeezed together thus rotating the pin 17 until the concavity 19 forms a bridge over the interrupted portion 16 of the surface of the counterbore 14 which now presents a complete circular cylindrical opening to receive a stud. The stud is inserted until it strikes the bottom 27 of the counterbore 14 whereupon the arms 18 and 21 are released permitting the spring 22 to rotate the pin 17 until the detent edge 20 bites into the stud and holds it firmly in the chuck.

Referring to Fig. 6 the invention is shown as applied to a rod clamp where the rod extends entirely through the clamp instead of only partially as in the case of welding studs. The embodiment shown in Fig. 6 is particularly useful in the case of adjustable rods such as on supports or adjustable legs such as on tripods or on stud welding guns or similar apparatus. In stud welding guns, especially, the device is useful to replace the clumsy thumb screw arrangement used in prior art stud welding guns for adjusting the leg of the gun which bears against the bulkhead to which a stud is to be welded. The application for this use is illustrated in a more or less fragmentary representation wherein the body member 28 of the clamp is shown as provided with the bracket 29 for attachment to the body of a stud welding gun. The adjustable leg 30 of the stud welding gun extends completely through the clamp body member 28 and is spring pressed away from the gun by means such as a collar 31 fixed to the leg and a light spring 32 acting between the collar 31 and the end of the body member 28. The leg is gripped by a locking pin 33 under the action of a spring 34 acting between the fixed arm 35 and the movable arm 36 formed as part of the pin 33. The motion of the arm 36 is limited by the stop member 37.

In operation the arms 35 and 36 are squeezed together releasing the grip on the leg 30. The stud welding gun is moved toward the bulkhead to which the studs are to be welded until it reaches the proper point as determined by the length of the stud to be used. During this movement the point 38 of the leg 30 is continuously pressed against the bulkhead by the action of the spring 32. When the position of the gun is finally determined, the arms 35 and 36 are released thus permitting the pin 33 to grip the leg 30 and determine the length of the leg between the gun and the bulkhead.

While the foregoing embodiments of the invention have been shown in connection with solid cylindrical rods it is apparent that the device is equally applicable to tubular rods and studs and to rods and studs of different shapes, wherefore the term "rod" is to be so construed in the subjoined claims. Also the shape of the locking pin may be varied so that the detent edge 11 or 20 may be formed by the intersection of two planes or a plane and a curved surface or two concave curved surfaces instead of by a convex and a concave curved surface as shown most clearly in Fig. 5. That is, the locking edge may be in the form of a knife edge tooth such as would be presented by a prismatic portion of the locking pin or a cuspoid tooth or a tooth of any other suitable design.

While I have shown but several embodiments of my invention, it is apparent that the device is susceptible to further modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A stud chuck comprising a generally cylindrical body member, said body member having a concentric bore therein to receive a stud, said chuck having a second cylindrical bore substantially smaller in diameter than said first bore extending longitudinally through the wall of said body member and intersecting said first bore to interrupt a relatively small portion of the circumferential surface thereof, a generally cylindrical pin journalled in said second bore, said pin having a concavity of the same curvature as said first bore and of such size as to bridge the interrupted surface of the first bore, an intersection of the surface of the concavity with the cylindrical surface of said pin forming a detent edge on said pin, an arm fixed to one end of said body member and extending outwardly from a diametral plane thereof, a second arm fixed to said pin and extending outwardly therefrom, a spring interposed between said arms and tending to force them apart and stop means limiting the motion of said second arm.

2. A rod clamp comprising a body member having a cylindrical bore therein, a pin journalled in said bore, said clamp having a second cylindrical bore for receiving a rod eccentric to said first bore, the greater portion of the surface of said second bore being constituted by a concavity in said pin and the remaining smaller portion of the surface of said second bore being constituted by a concavity in the wall of said first bore, a circumferential slot in said body member communicating with said first bore, an arm fixed to said pin extending outwardly from the axis thereof, and spring means biasing said arm to rotate said pin into a position wherein an edge of said concavity in said pin engages said rod.

3. A stud chuck comprising a body member having a cylindrical bore therein, a generally cylindrical pin journalled in said bore, said chuck having a counterbore for receiving a stud described about an axis parallel to that of said bore and formed partially in a wall of said body member and more extensively in said pin, an arm fixed to said body member and extending transversely outwardly therefrom, said body member having a circumferentially extending slot therein communicating with said bore, an arm fixed to said pin and extending outwardly therefrom through said slot, and a spring interposed between said arms to force them apart.

4. A rod clamp comprising a generally cylindrical member having a cylindrical bore to receive a rod, and having a cylindrical opening extending longitudinally through the wall thereof and intersecting said bore, a generally cylindrical pin journalled in said opening, said pin having a longitudinal concavity formed in its surface to conform to the curvature of said bore, the intersection of the surface of said concavity with the cylindrical surface of said pin constituting a detent edge, an arm extending transversely from said pin manually operable to rotate said pin into a position wherein said concavity forms a continuation of the surface of said bore and spring means biasing said arm to rotate said pin into a position where said detent edge engages said rod.

5. A clamp comprising a first member having an opening therein shaped to receive a rod and conform to a portion of the surface thereof, a second member journalled in said first member about an axis parallel to the longitudinal axis of said opening and having a portion shaped to form a continuation of the surface of said opening and conform to the curvature of said rod and having also a detent portion for frictionally engaging said rod, an arm extending radially from said second member manually operable to rotate said second member into a position wherein said first mentioned portion thereof conforms to the surface of said rod, and means biasing said arm to rotate said second member into a position wherein said detent portion engages said rod.

6. A rod clamp comprising a body member having a generally cylindrical opening therein for receiving a rod, the surface of said opening having a break therein, a pin journalled in said body member about an axis parallel to the longitudinal axis of said cylindrical opening, said pin having a detent portion for projection through said break in the surface of said cylindrical opening to engage said rod, an arm fixed to said pin for rotating said pin and means biasing said arm to rotate said pin into a position wherein said detent portion projects into said cylindrical opening.

7. A rod clamp comprising a body member having an opening therein shaped to receive a rod, a detent member journalled in said body member about an axis parallel to the longitudinal axis of said opening and having a detent portion adapted to project into said opening to engage said rod, means for rotating said detent member, and means biasing said detent member into rod-engaging position.

GEORGE BENNETT.

REFERENCES CITED

The following references are of record in the file of this patent:

UNITED STATES PATENTS

| Number | Name | Date |
| --- | --- | --- |
| 1,954,049 | Jeffrey | Apr. 10, 1934 |
| 2,320,397 | Ross | June 1, 1943 |